J. N. ALSOP.
PRESERVING GAS.
APPLICATION FILED APR. 28, 1913.
1,219,527.
Patented Mar. 20, 1917.
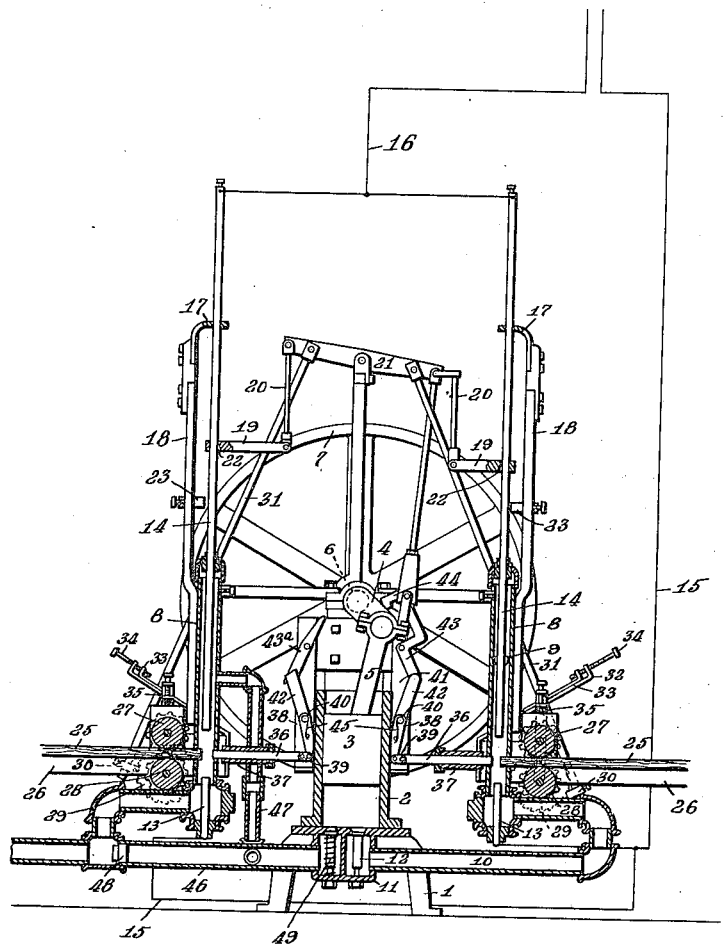
Witnesses
Inventor
James N. Alsop
By Meyers, Cushman & Rea
Attorney

UNITED STATES PATENT OFFICE.

JAMES N. ALSOP, OF OWENSBORO, KENTUCKY, ASSIGNOR TO ALSOP ELECTRICAL COMPANY, OF OWENSBORO, KENTUCKY, A CORPORATION OF KENTUCKY.

PRESERVING-GAS.

1,219,527.            Specification of Letters Patent.       Patented Mar. 20, 1917.

Original application filed November 9, 1910, Serial No. 591,503. Divided and this application filed April 28, 1913. Serial No. 764,291.

*To all whom it may concern:*

Be it known that I, JAMES N. ALSOP, a citizen of the United States, residing at Owensboro, in the county of Daviess and State of Kentucky, have invented new and useful Improvements in Preserving-Gas, of which the following is a specification.

This invention relates to the product of the discovery that by subjecting atmospheric air to the influence of an electric arc, vaporizing an organic substance, and mixing the two gaseous products while the treated air possesses characteristics imposed upon it by the electric arc, a useful gas is produced, which may, among other uses, be advantageously employed for the preservation of fresh meats, curing hides, and as a therapeutic agent; and this application is a division of my application for Letters Patent filed the ninth day of November, 1910, and granted April 29, 1913, Patent No. 1,060,410.

In producing this gas, it is preferred to subject atmospheric air and the organic substance simultaneously to the influence of an electric arc, which thus serves not only to act upon the air, but to vaporize or gasify the organic substance; or, as an alternative, to utilize the intense heat of the gaseous product resulting from the action of the arc upon atmospheric air to vaporize or gasify the organic substance.

The invention is not to be restricted to a theory of the chemical or electro-chemical action which is manifested in the production of the gas, nor to the chemical constituents of the gas, but there is reason to believe that the constituents of the treated atmospheric air are caused to combine more or less, resulting in a dilute nitrous gas in a state of ionization, and that the organic substance is vaporized or gasified and in a state of ionization; and that when brought together in such state, or at least while the dilute nitrous acid gas is in such state, a chemical union of the two gases takes place. The resulting gas probably differs in its constituents, dependent upon the particular organic substance employed; but such gases have at least a general identity in their properties as being preservative, useful in curing hides, and as a therapeutic agent.

It is preferred to use as the organic substance a vegetable organism, especially wood. Hickory, oak and pine have been used with excellent results. A part of the vapors or gases of these substances are condensable at ordinary temperatures, and, therefore, the vapors or gases which, in accordance with this invention are brought into contact with atmospheric air subjected to the action of an electric arc, include those vapors or gases which are, as stated, condensable at ordinary temperatures.

The resulting gas produced by the method of the invention may be subjected to a succession of treatments by the electric arc if desired, and such treatments result in strengthening or concentrating the gas.

In the accompanying drawing is shown one suitable type of apparatus organized for subjecting the gas resulting from treatment in one arc to subsequent treatment by another, and it will be understood that this treatment may be added to by treatment with additional arcs.

The apparatus shown is one which has been employed and which is preferred, but it will be understood that the method of producing the gas may be carried out by altogether different apparatus. A description of the preferred apparatus shown, and that which takes place therein, will be a disclosure of the method practised.

Referring to said drawing, the reference numeral 1 designates a suitable base upon which is mounted the cylinder 2 of a pump within which works a piston 3 that may be conveniently reciprocated by a crank arm 4 connected to the rod 5 of the piston and mounted upon a rotary shaft 6 that carries a suitable driving pulley 7, which may be driven from any suitable source of power. The numeral 8 designates the chamber in which the reaction takes place, and as shown, consists of a vertically disposed tube, that which has been employed being constructed of iron, lined with the refractory substance asbestos. An intake opening 9 is provided in this tube, open to the atmosphere, and the tube is in communication with the pump cylinder by means of a piping system 10, rigidly connected to the valve casing 11 supported by the base 1, to serve as a support for the treating chamber 8. In the valve casing is arranged a suitable check valve 12 which permits the pump piston to draw air through the treating chamber 8 to be subjected to the action of the electric arc therein on the suction stroke of the piston, and closes the port on the return stroke thereof. Within the treating chamber, in the particular apparatus shown (to which apparatus, however, the invention is not restricted) is a stationary electrode 13 and a reciprocating electrode 14, those which have been employed having been of iron, suitably mounted and insulated in any of the ways known to the electrical art.

The electrodes are connected to the positive and negative ends of a source of electricity, as indicated by the numerals 15, 16.

In practice, as has been found suitable, the current may be generated by a dynamo, and, preferably, a choking coil (not shown) is included in the circuit. A current of 500 volts and an amperage of 2 or 3 amperes at the arc has been found suitable with a pump cylinder three inches in diameter, the piston of which has a four inch stroke and about sixty active strokes to the minute. The invention, of course, is not restricted to these conditions which are merely mentioned as suitable.

The movable electrode 14 may be reciprocated by any convenient means. As shown it passes through a guide eye 17 carried by a standard 18 supported by the wall of the treating chamber 8. The electrode is gripped by an arm 19 pivotally connected by a link 20 to one end of a walking beam 21. The electrode gripping arm 19 has a perforation 22 through its free end to receive and grip the electrode to impart reciprocatory movement thereto from the movement of the walking beam. To feed the electrode as it is consumed an abutment 23 carried by the standard 18 is arranged in the path of movement of the gripper arm, so that at each forward reciprocation of the electrode the abutment engages the gripping arm, turns it upon its pivotal point with the link 20, and by reason of the flaring wall of the perforation 22 frees the electrode from the gripping arm and allows it to feed. The object of this arrangement is, generally, to bring the movable electrode into contact with the stationary one to strike an arc, so that a low amperage may be employed, then move it away to elongate the arc until it breaks, a rapid succession of arcs being made and broken during the operation of the apparatus. The invention, however, is not confined to this particular character of arc, as a stable arc now well known in the electrochemical art may well serve the purpose.

The treating chamber 8 is provided, in the zone of the arc, with a passage 24 through which the organic substance, which is represented in the drawing as a slab of wood 25, may be projected into the path of the arc to be acted upon by the arc in the presence of the atmospheric air or the products resulting therefrom by the action of the arc. As shown, this organic substance, wood, is supported upon a table 26 and arranged to engage and feed the same to the arc are upper and lower rollers 27, 28, having intermeshing gear, the lower end of which is provided with a ratchet 29 with the teeth of which engages a pawl 30 carried by a pitman 31 connected to the walking beam 21, to intermittently feed a definite portion of the wood to the arc.

The amount of feed is capable of variation according to desire. A suitable means by which this may be accomplished is illustrated in the drawing, wherein the pitman 31 passes through a slot in a guide 32 upon which is mounted a slotted gage 33 through which slot the pitman also passes. An adjusting screw 34 is provided engaging the guide and the gage so that the pitman may be adjusted to reciprocate in paths differing in radial distance from the axis of the ratchet, and thus rotate the latter correspondingly different distances, for a greater or less feed as may be desired.

The upper roller 27 is arranged in an open bearing, and a spring 35 bears against its shaft or pintle so that it is yieldingly mounted, being caused to effectively coöperate with the roller 28 to feed the slab of wood, and at the same time capable of yielding to compensate for inequalities or to accommodate slabs of different thickness.

The operation of the mechanism is timed, so that the organic substance is fed into the field of influence of the arc or the hot gases produced by the arc immediately after the latter has been struck and during the period of its elongation, and is retracted just after the arc breaks.

To insure that the end of the organic substance which is exposed in the treating chamber to be vaporized gasified or burned will assume each time it is projected the same relative relation to the arc, or the hot gases produced thereby, suitable means are provided to accurately position the wood each time it is withdrawn after the arc is broken, so that if the feed be regular the consideration mentioned will be accomplished. This means, as shown, consists of a pusher 36 passing through a guide tube 37 and pivotally connected to an arm 38 by a link 39. The arm 38 is fixed to a rocking stud shaft 40 carried by a support 41 supported by the pump cylinder. This stud shaft is rocked, conveniently, by means of an arm 42 having a pin fitting in the forked end of a lever 43 pivotally mounted on the support 41, and having its free end 44 arranged in the path of movement of the crank arm 4 to be engaged thereby during each rotation of the latter to project the pusher into engagement with the slab of wood for the purpose above mentioned, after which the pusher is retracted, conveniently, by means of a spring 45, shown as a flat spring, one end of which is connected to the support 41 and the other to the rock shaft 40. The movement of these parts is so timed that when, or immediately after, the arc is broken, the pusher is operated to position the organic substance, wood, accurately for the next feed thereof as above set forth.

The product thus obtained is drawn into the pump cylinder and may be discharged therefrom for immediate use in treating fresh meats or preserving the same, or conveyed to a place of storage for future use, as the preservative characteristic of the gas exists for an appreciable length of time. The gas has been found useful in curing hides, and as a therapeutic agent.

As above explained, the apparatus shown is organized for subjecting the gaseous product from the first tube 8 to the action of a second arc, and for this purpose the pump cylinder is in communication with a piping system 46 which is rigidly supported by the valve casing 11, so that it may in turn support the second treating chamber 8, and for the purpose of this support the piping system comprises a branch 47 leading into the second treating chamber 8, and is plugged as shown at 48 to compel passage through the branch 47. The communication between the pump cylinder and the piping system is controlled by a check valve 49.

The mechanism appropriate to this second chamber is exactly like that which has been described with reference to the first chamber, and is indicated correspondingly by the numerals in the drawing, except that the form of the lever 43ª differs from that of the lever 43, so that it may be appropriately acted upon by the crank arm 4.

The treatment in the second chamber, as stated, strengthens the resulting gas or increases its concentration, and may be extended by treatment by any desired number of subsequent arcs.

Having thus described the invention, and that method and apparatus which I regard as the best manner of and means for obtaining the product, what I claim is:—

1. A gas having germicidal and therapeutic properties and which is derived from the action of an electric arc upon atmospheric air in the presence of the vaporized products of a substance having carbohydrates, cellulose and lignin as its constituents.

2. A gas having germicidal and therapeutic properties and which is derived from the action of an electric arc upon atmospheric air in the presence of vaporized products of wood.

3. A gas having germicidal and therapeutic properties resulting from mixing dilute nitrous gas in a state of ionization and the vaporized products of wood in a state of ionization, and which results from the action of an electric arc upon atmospheric air and the gaseous products of a vegetable substance having carbohydrates, cellulose and lignin as its constituents in the presence of each other.

4. A gas having germicidal and therapeutic properties and which results from the action of an electric arc upon atmospheric air and the vaporized products of wood in the presence of each other.

5. A gaseous product having preservative qualities and therapeutic properties and obtained by subjecting atmospheric air to the action of an electric arc to obtain dilute nitrous gas in the state of ionization, and while such atmospheric air retains the characteristics imposed thereon by the arc commingling therewith vaporized products of wood which are in a state of ionization and which are condensable at ordinary temperatures.

In testimony whereof I have hereunto set my hand in presence of two subscribing witnesses.

JAMES N. ALSOP.

Witnesses:
GERTRUDE M. STUCKER,
E. C. GIBBS.